United States Patent Office 3,196,084
Patented July 20, 1965

3,196,084
PROCESS FOR PREPARING CEPHALOSPORIN C
Giulia Biffi, Monza, Milan, and Arpad Grein and Celestino Spalla, Milan, Italy, assignors to Società Farmaceutici Italia, Milan, Italy, a corporation of Italy
No Drawing. Filed July 23, 1963, Ser. No. 296,931
Claims priority, application Italy, July 25, 1962, 15,033/62
1 Claim. (Cl. 195—36)

Our invention relates to an improvement in the production of Cephalosporin C by microbiological fermentation.

The known production of Cephalosporin C (British patent specification No. 810,196) by microbiological fermentation from a Cephalosporin C-producing mold of the species of which Cephalosporium C.M.I. 49,137 (American Culture collection No. 11,550) is a member by a nutrient medium containing sources of carbon and nitrogen and mineral salts, gives relatively low yields of antibiotic.

Our invention has as an object to increase such yields.

We have found that the addition of phenylacetic acid amide to the fermentative medium stimulates the production of antibiotic and leads to nearly double yields. Any mutant strain of the Cephalosporium C.M.I. 49,137 species may be employed in the fermentative process. The carbon source may for example be dextrose, glucose, saccharose, maltose, dextrin, lactose, starch, vegetable oils and other analogous compounds. The nitrogen source may, for example, be hydrolyzates of casein, extract of malt, fish meal, meat meal, corn steep liquor, peptones, amino acids or their analogues. As an assimilable nitrogen source, even ammonium salts, such as ammonium acetate, phosphate or sulfate, may be employed. The mineral salts employed in the fermentation may, for example, be inorganic salts of copper, calcium, magnesium, zinc, iron, sodium and their analogues.

The strain employed is cultured in an aerated and submerged culture in flasks or fermenters under the following suitable conditions: temperature 20°–30° C., preferably 27° C.; time 60–80 hours; a pH from 6 to 7.5. To the culture medium the phenylacetic acid amide, preferably in quantity between 4‰ and 6‰ with respect to the culture medium is added. The symbol ‰ is used herein in the usual sense to indicate parts per thousand.

The formation of Cephalosporin C is followed by titration, according to known biological and chemical methods. A sample of culture broth is withdrawn and the Cephalosporin N, which is also formed in the fermentation, is destroyed by acidifying with an inorganic acid, such as phosphoric acid, to adjust the pH-value from 1.5 to 3.5. The titration is preferably carried out by means of ninhydrin or by a microbiological method using the *Vibrio cholerae* (Bond et al., J. Gen. Microbiol., 1962, 27, pp. 11–12). After having reached the optimum Cephalosporin C. production, the antibiotic is separated from the culture broth, preferably by adsorption on an ionic exchange resin and elution (British patent specification No. 810,196).

The following examples are to illustrate, but not to limit, the invention.

*Example 1*

In a 5-liter glass fermenter provided with a stirrer and an aeration device, 3 liters of the following preinoculation medium are sterilized:

Corn steep liquor _____ g__ 19.6
Ammonium acetate _____ g__ 4.4
Saccharose _____ g__ 20
Tap water _____ l__ 1
pH 6.5 after sterilization.
Sterilization: 120° C. for 90 minutes.

After cooling, the medium is inoculated with a spore suspension of the Cephalosporium sp. C.M.I. 49,137 strain and incubated for 72 hours at 24° C. with an aeration rate corresponding to 3 liters per minute and a stirring rate of 400 r.p.m. with a 4-paddle stirrer. In two fermenters similar to that described above, 3 liters of the following production medium are sterilized:

Fish meal _____ g__ 6.6
Meat Meal _____ g__ 3
Corn steep liquor _____ g__ 1.16
Ammonium acetate _____ g__ 1.9
Saccharose _____ g__ 12
Glucose _____ g__ 3
DL-methionine _____ g__ 0.5
Tap water _____ l__ 1
pH 6.6 after sterilization.
Sterilization: 120° C. for 120 minutes.

Before the sterilization, 5‰ by weight phenylacetic acid amide with respect to the medium is added to one of the fermenters. The two fermenters are inoculated with 120 cc. of the culture obtained on the preinoculation medium, then incubated at 27° C. with an aeration rate of 3 liters per minute and stirring rate of 550 r.p.m. with a 4-paddle stirrer. Every day, a small amount of culture broth is taken from each fermenter to check the Cephalosporin C content. Cephalosporin C is microbiologically titrated using *Vibrio cholerae* (Bond et al.: J. Gen. Microbiol., 1962, 27, pp. 11–19) after acidic decomposition of the Cephalosporin N also present in the broth (Newton and Abraham: Biochem. J., 1954, 62, p. 651). The average highest production of Cephalosporin C obtainable during 5 fermentations is 2.60 units per cc. in the medium to which phenylacetic acid amide was added and 1.40 units per cc. in the untreated medium.

Cephalosporin C is then separated from the fermentation broth by adsorption on an ionic exchange resin and elution with an aqueous solvent.

*Example 2*

The process is carried out as in Example 1, but using a fermentation medium having the following composition:

|  | G. |
|---|---|
| Fish meal | 6.6 |
| Meat meal | 3 |
| Corn steep liquor | 1.16 |
| Ammonium acetate | 4 |
| Saccharose | 12 |
| Glucose | 3 |
| DL-methionine | 0.5 |
| $CaCl_2$ | 0.5 | pH 6.6 after sterilization.
Sterilization at 120° C. for 120 minutes.

The average content of Cephalosporin C obtainable during five fermentations is 2.80 units per cc., when the medium is treated with phenylacetic acid amide, and 1.85 units per cc. in the untreated medium.

We claim:
In the process for the preparation of Cephalosporin C by culturing a Cephalosporin C producing mold of the species of which Cephalosporium C.M.I. 49,137 is a member, in a suitable nutrient medium containing a source of carbon, nitrogen and mineral salts, and recovering Cephalosporin C from the fermentation broth; the improvement which comprises adding 4‰ to 6‰ phenylacetic acid amide to the culture broth.

References Cited by the Examiner
UNITED STATES PATENTS 2,609,330  9/52  Stanley _____ 195—100
3,082,155  3/63  Kelly et al. _____ 195—36
3,116,217  12/63  Demain _____ 195—36

A. LOUIS MONACELL, *Primary Examiner.*